(12) United States Patent
Yang et al.

(10) Patent No.: US 9,086,524 B2
(45) Date of Patent: Jul. 21, 2015

(54) METHODS FOR MANUFACTURING OPTICAL FIBER PREFORM AND METHODS FOR MANUFACTURING OPTICAL FIBER

(75) Inventors: Chen Yang, Wuhan (CN); Qingrong Han, Wuhan (CN); Weijun Tong, Wuhan (CN); Jie Luo, Wuhan (CN); Yongtao Liu, Wuhan (CN)

(73) Assignee: Yangtze Optical Fibre and Cable Joint Stock Limited Company, Wuhan (CN)

( * ) Notice: Subject to any disclaimer, the term of this patent is extended or adjusted under 35 U.S.C. 154(b) by 7 days.

(21) Appl. No.: 13/603,399

(22) Filed: Sep. 4, 2012

(65) Prior Publication Data

US 2012/0324958 A1 Dec. 27, 2012

Related U.S. Application Data

(63) Continuation-in-part of application No. PCT/CN2011/074237, filed on May 18, 2011.

(51) Int. Cl.
*C03B 37/018* (2006.01)
*C03B 37/027* (2006.01)
(Continued)

(52) U.S. Cl.
CPC .......... *G02B 6/0285* (2013.01); *C03B 37/014* (2013.01); *C03B 37/0183* (2013.01); *C03B 37/01211* (2013.01); *C03B 37/01892* (2013.01); *C03B 37/02754* (2013.01); *C03C 13/045* (2013.01); *G02B 6/02395* (2013.01); *G02B 6/03633* (2013.01); *C03B 2201/02* (2013.01); *C03B 2201/04* (2013.01); *C03B 2201/075* (2013.01); *C03B 2201/12* (2013.01);
(Continued)

(58) Field of Classification Search
None
See application file for complete search history.

(56) References Cited

U.S. PATENT DOCUMENTS 4,262,035 A * 4/1981 Jaeger et al. ............ 427/571
5,106,402 A * 4/1992 Geittner et al. ............ 65/391
(Continued)

FOREIGN PATENT DOCUMENTS

CN 101585658 A * 11/2009
CN 101598834 A * 12/2009
GB 2208114 A * 3/1989

OTHER PUBLICATIONS

Geitner, "Hybrid Technology for Large SM Fibre Preforms", Optical Fiber Communication Conference, vol. 1, Jan. 1988, pp. PD5-1 to PD5-4.*

(Continued)

*Primary Examiner* — Lisa Herring
(74) *Attorney, Agent, or Firm* — Matthias Scholl P.C.; Matthias Scholl

(57) ABSTRACT

A method for manufacturing an optical fiber preform, including: a) providing a lining tube as a substrate tube, and doping and depositing by a PCVD or an MCVD process; b) in the reacting gas of silicon tetrachloride and oxygen, introducing a fluorine-containing gas for fluorine doping, introducing germanium tetrachloride for germanium doping, ionizing the reacting gas in the lining tube through microwaves to form plasma, depositing the plasma on the inner wall of the lining tube in the form of glass; c) after the completion of deposition, processing the deposited lining tube into a solid core rod by melting contraction through an electric heating furnace; d) sleeving the solid core rod into a pure quartz glass jacketing tube and manufacturing the two into an optical fiber preform; and e) allowing the effective diameter d of the optical fiber preform to become between 95 and 205 mm.

16 Claims, 16 Drawing Sheets

(51) Int. Cl.
*G02B 6/028* (2006.01)
*C03B 37/012* (2006.01)
*C03B 37/014* (2006.01)
*G02B 6/036* (2006.01)
*G02B 6/02* (2006.01)
*C03C 13/04* (2006.01)

(52) U.S. Cl.
CPC ......... *C03B2201/86* (2013.01); *C03B 2203/23* (2013.01); *C03B 2205/09* (2013.01); *C03B 2205/14* (2013.01); *C03C 2201/12* (2013.01); *C03C 2201/23* (2013.01); *C03C 2201/31* (2013.01); *C03C 2203/40* (2013.01); *G02B 6/0283* (2013.01)

(56) References Cited

U.S. PATENT DOCUMENTS

| | | | | |
|---|---|---|---|---|
| 2002/0136515 | A1* | 9/2002 | Schaper et al. | 385/123 |
| 2003/0063878 | A1* | 4/2003 | Matsuo et al. | 385/123 |
| 2008/0226912 | A1* | 9/2008 | Norlin et al. | 428/392 |
| 2008/0241535 | A1* | 10/2008 | Cattron et al. | 428/392 |
| 2011/0058780 | A1* | 3/2011 | Han et al. | 385/124 |
| 2012/0087625 | A1* | 4/2012 | Han et al. | 385/124 |

OTHER PUBLICATIONS

Draka, "BendBright Single Mode Optical Fibre", Nov. 2007.*

* cited by examiner

METHODS FOR MANUFACTURING OPTICAL FIBER PREFORM AND METHODS FOR MANUFACTURING OPTICAL FIBER

CROSS-REFERENCE TO RELATED APPLICATIONS

This application is a continuation-in-part of International Patent Application No. PCT/CN2011/074237 with an international filing date of May 18, 2011, designating the United States, now pending, and further claims priority benefits to Chinese Patent Application No. 201010229123.4 filed Jul. 13, 2010. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 14781 Memorial Dr., Suite 1319, Houston, Tex. 77079.

BACKGROUND OF THE INVENTION

1. Field of the Invention

The invention relates to methods for manufacturing a large-size bend-insensitive low-water-peak single mode optical fiber preform and an optical fiber.

2. Description of the Related Art

In the process of manufacturing fibers, because of the existence of the absorption peak (it is also known as "water peak") caused by the hydroxyl (OH) within 1360-1460 nm, the usage of the fibers at the wavelength range is limited. To apply the fibers in the whole wavelength range, the water peak within that range shall be eliminated. Thus, the fibers can offer an available wavelength range with a width as wide as 400 nm. In accordance with the specification of ITU-T G.652.C/D, the fibers, having the attenuation less than the specified value of 1310 nm within the range of 1383±3 nm, are generally called "low water peak fibers" or "zero water peak fibers". In ITU-T G.652.C/D optical fiber standard, it has been clearly stipulated that the attenuation coefficient of optical fibers at the 1383±3 nm wavelength band is not more than 0.4 dB/km. Such optical fibers are combined with the CWDM (coarse wavelength-division multiplexing) technology, thus the larger information capacity and longer distance without repeater can be provided.

In recent years, with the development of the optical fiber access network, the laying of optical fibers is getting closer to the end user. When considering that optical fibers are laid in buildings or indoors, optical fibers should have good bending resistance including optical bending resistance and mechanical bending resistance. During the process of laying optical fibers in buildings or indoors, when the bending radius of optical fibers is 10 mm, 7.5 mm, or even 5 mm, optical fibers must have the performance of low additional loss under the condition of extremely small bending radius. In a miniature optical device, it also requires that optical fiber has low additional loss under the small bending radius, so as to reduce the space occupied by optical fibers. Meanwhile, the mechanical properties of optical fibers are required to be enhanced, so as to ensure the mechanical reliability of optical fibers in the long-term small bending radius working state.

Since the bending radius of conventional fibers with a low water peak (in conformity with ITU-T G.652C/D) is generally 30 mm, laying such fibers indoors or in narrow spaces is greatly restricted, especially the ones with long wavelength (U wave wavelength band: 1625-1675 nm). For this reason, it is required to design and develop a fiber with bending insensitive properties to satisfy the FTTH installation and the usage requirements of long wavelength. In December 2006, ITU-T came up with a new fiber standard (G.657 fiber): Characteristics of a bending loss insensitive single mode optical fiber and cable for the access network. Thus, developing single-mode fibers with a low water peak and anti-bending properties is of great significance for promoting the development of the FTTx technology.

In the present bend-insensitive single mode optical fibers with obviously improved bending properties, the purpose of reducing the bending loss is achieved mainly through designing a waveguide structure different from G.652 optical fibers.

Studies show that the bending resistance of optical fibers can be enhanced by adopting the structural design of an air cladding layer, but the optical fiber is relatively high in manufacturing cost, complex in process, difficult in optical-fiber connection and not favorable for popularization and application.

Through the design of a depressed cladding layer, the bending resistance of optical fibers can be effectively enhanced, the bend-insensitive single mode optical fibers can be realized, the additional loss of optical fibers under the small bending radius can be effectively reduced, however, the mechanical reliability of optical fibers under the small bending radius is decreased.

When a fiber bends, the outside thereof is exposed to the tensile stress. The tensile stress is represented by the following formula:

$$\sigma = \frac{E \cdot r}{(R + C_{th} + r)}$$

wherein E represents young modulus of quartz glass, R represents a bending radius, r represents the radius of a fiber, and $C_{th}$ represents the thickness of a coating. Based on the formula and the bending radius, the tensile stress imposed on a fiber with a glass cladding diameter of 125 µm and an outer diameter of 250 µm is calculated, as shown in FIG. 6. For example, when the bending radius is decreased to 6.5 mm, the tensile stress imposed on the outer bending wall of the fiber is 0.69 GPa (100 kpsi), which reaches the common screening tension of fibers. Bending easily causes fracture, thereby increasing the building and maintenance cost and affects the reliability of systems. The appendix of fiber standard ITU-T G.657 briefly describes the prediction of fiber life. The service life of fibers is related to the dynamic stress corrosion susceptibility parameter thereof. Under identical bending radius and storage length, the higher the dynamic stress corrosion susceptibility parameter of fibers, the higher the mechanical reliability thereof. Thus, it is urgent to develop a fiber that has low additional bending loss and stable mechanical properties.

There are four conventional methods to manufacture a fiber preform: modified chemical vapor deposition (MCVD), plasma chemical vapor deposition (PCVD), outside vapor deposition (OVD), and vapor axial deposition (VAD). The MCVD and PCVD methods belong to an inner tube method, and thus, if an outer depressed cladding layer is required, it is difficult to make a large-sized preform (with a diameter over 100 mm) due to the limit of the tubes. Furthermore, the inner tube method has a low deposition rate. When OVD and VAD methods are applied, it is required to make a fluorine-doped cladding layer in the process of depositing a core layer and an inner cladding layer. However, the process is difficult to control and the refractive index profile cannot be effectively controlled due to dispersion of fluorine during the sintering process. A practical production method is to first deposit a core rod including a cladding layer with a certain thickness, followed by dehydration and sintering, and then to deposit a fluorine-doped cladding layer on the glass core rod. The fluorine can be directly added during the deposition process or during the sintering process. As the OVD and VAD methods both belong to a flame ($H_2/O_2$) hydrolysis method, the deposits have to be directly exposed to the hydrogen/oxygen flame ($H_2/O_2$) when deposition occurs on the glass core rod. Thus, a large amount of hydroxyl (OH) produced from the $H_2/O_2$ flame will spread into the core layer, resulting in an increase in the water peak attenuation of the fibers; therefore, the cladding layer around the glass core rod shall be thick enough to prevent the OH from spreading inwards. However, if the cladding layer is too thick, the fluorine-doped cladding will be far from the core layer, and therefore the anti-bending performance of the fibers cannot be improved.

In the conventional optical fiber preform process, low-water-peak optical fiber core rods with smaller size are required to be prepared first, if an inner tube method is adopted, a lining tube is required, and a lathe is required for melting contraction of core rods after the completion of deposition of quartz. Meanwhile, a small fluorine-doped quartz glass lining tube is prepared, then the optical fiber core rods are sleeved in the small fluorine-doped quartz glass casing tube, combined core rods are obtained through melting contraction, and finally, the combined core rods are externally clad to form large-size preforms for fiber drawing. In the technical scheme, a lining tube is required for depositing low-water-peak core rods, meanwhile, various treatment of melting contraction, corrosion, cleaning, and drying is carried out to the low-water-peak core rods, and melting contraction is performed to the core rods and small fluorine-doped quartz glass casing tube. The large-size preforms are formed after sleeving and melting contraction twice, thus not only the processing links are more, the process is more complex, but also the low-water-peak performance and bending resistance of the manufactured optical fibers are also affected due to the more sleeving interfaces.

SUMMARY OF THE INVENTION

In view of the above-described problems, it is one objective of the invention to provide a method for manufacturing a large-size optical fiber preform and optical fiber. The large-size optical fiber preform not only has large outside dimension and high manufacturing efficiency, but also can be used for manufacturing low-water-peak single mode optical fibers with small additional bending loss and high dynamic stress corrosion susceptibility parameter; the large-size optical fiber preform also has the characteristics of simple and flexible process and low manufacturing cost, and is suitable for large-scale production.

For the purpose of the invention, related terms are defined below:

Preform: it refers to a glass rod or a combination of a core layer and a cladding layer, and the radial refractive index thereof conforms to the requirement for designing a fiber; the glass rod or the combination can be directly manufactured into a fiber.

Core rod: it refers to a prefabricated part comprising a core layer and some cladding layers.

a: the diameter of a core layer of a fiber core rod (unit: mm);

b: the diameter of an inner cladding of a fiber core rod (unit: mm);

c: the diameter of a depressed cladding of a fiber core rod (unit: mm); and d: the effective diameter of a fiber preform, i.e., for a solid preform, it refers to an outer diameter; for a RIC preform, d=

$$\sqrt{\frac{\left(\begin{array}{c} CSA \text{ of the large jacketing tube} + \\ CSA \text{ of core rod assembly} \end{array}\right) * 4}{\pi}}$$

(unit: mm).

Lining tube: a substrate tube, which refers to a fluorine-doped or pure quartz glass tube with appropriate geometry structure.

Jacketing tube: it refers to a pure quartz glass tube with appropriate geometry structure.

$$\Delta \% = \left[\frac{(n_1^2 - n_0^2)}{2n_1^2}\right] \times 100\%,$$

Relative refractive index difference: wherein, $n_1$ and $n_0$ represent refractive indexes of two types of glass materials, respectively. In this invention, $n_0$ represent the refractive index of pure quartz glass.

Wall thickness: it refers to a unilateral thickness of a tubular glass, i.e., the wall thickness=(outer diameter−inner diameter)/2 (unit: mm).

CSA: it refers to the cross sectional area (unit: $mm^2$).

OVD process: it is a process to deposit $SiO_2$ glass to a desired thickness on the surface of a core rod using an outside vapor deposition and sintering process.

VAD process: it is a process to deposit $SiO_2$ glass to a desired thickness on the surface of a core rod using a vapor axial deposition and sintering process.

APVD (Advanced Plasma Vapor Deposition) process: it is a process to deposit $SiO_2$ glass to a desired thickness by melting a natural or synthetic quartz powder on the surface of a core rod using a high frequency plasma flame.

RIC process: it refers to a manufacturing process of a large-sized fiber preform by inserting a core rod into a jacketing tube after processing the core rod and the casing tube (comprising tapering process, elongation, corrosion, wash, and desiccation and so on).

Bare fiber: it refers to a glass fiber without a coating layer.

To achieve the above objective, in accordance with one embodiment of the invention, there is provided a method for manufacturing an optical fiber preform, the method comprising:

providing a lining tube as a substrate tube, and doping and depositing by a PCVD (plasma chemical vapor deposition) or an MCVD (modified chemical vapor deposition) process, the lining tube being a fluorine-doped quartz glass lining tube or a pure quartz glass lining tube; for the pure quartz glass lining tube, its outer diameter being 45-55 mm, and its wall thickness being 2-4 mm; for the fluorine-doped quartz glass lining tube, the diameter of its inner hole being 25-40 mm, CSA being 250-1800 $mm^2$, the relative refractive index difference of an inner interface of the lining tube being between −0.2% and −0.35%, and the relative refractive index difference of an outer interface of the lining tube being between −0.2% and −0.35%, and the hydroxyl content of the lining tube being equal to or smaller than 0.10 ppm;

doping and depositing by the PCVD or MCVD process, in the reacting gas of silicon tetrachloride and oxygen, introducing a fluorine-containing gas for fluorine doping, introducing germanium tetrachioride for germanium doping, ionizing the reacting gas in the lining tube through microwaves to form plasma, depositing the plasma on the inner wall of the lining tube in the form of glass, and according to the doping requirements of the waveguide structure of optical fiber, changing the flow rate of gas doped in the mixed gas to deposit cladding layers and a core layer in sequence;

after the completion of deposition, processing the deposited lining tube into a solid core rod by melting contraction through an electric heating furnace;

sleeving the solid core rod into a pure quartz glass casing tube and manufacturing the two into an optical fiber preform by an RIC process, the difference between the diameter of the inner hole of the pure quartz glass casing tube and the diameter of the solid core rod being 1.5-4 mm; or directly depositing a pure $SiO_2$ glass outer cladding layer on the core rod to obtain the optical fiber preform; and allowing the effective diameter d of the optical fiber preform to be 95-205 mm.

In a class of this embodiment, after the deposited lining tube is melt-contracted into the solid core rod, corrosion treatment is carried out to the solid core rod, and the diameter difference of the solid core rod before and after corrosion reaches between 0.5 and 4.5 mm.

In a class of this embodiment, the ratio b/a between the diameter b of an inner cladding layer of the core rod and the diameter a of the core layer of the core rod of the optical fiber preform is 1.8-2.8, the ratio (c−b)/a between the difference between the diameter c of a depressed cladding layer of the core rod and the diameter b of the inner cladding layer of the core rod and the diameter a of the core layer is 1.0-2.8, the effective diameter d of the optical fiber preform is 95-205 mm, and the ratio d/c between the effective diameter d of the optical fiber preform and the diameter c of the depressed cladding layer of the optical fiber core rod is 3.5-5.

In a class of this embodiment, in the fluorine-doped quartz glass lining tube, the relationship between the relative refraction index difference $\Delta_{31}$ of its inner interface and the relative refraction index difference $\Delta_{32}$ of its outer interface is $\Delta_{31}=\Delta_{32}$, $\Delta_{31}>\Delta_{32}$, or $\Delta_{31}<\Delta_{32}$, and $|\Delta_{31}-\Delta_{32}|$ is 0-0.1%.

In a class of this embodiment, the hydroxyl content of the lining tube is equal to or smaller than 0.05 ppm, and particularly, equal to or smaller than 0.03 ppm.

In a class of this embodiment, for the fluorine-doped quartz glass lining tube, when the CSA thereof is smaller than a designed circular ring area of the depressed cladding layer of the core rod, before the deposition of the inner cladding layer, some fluorine-doped depressed cladding layers are deposited by the PCVD process, so that the sum between the CSA of the fluorine-doped depressed cladding layer deposited by the PCVD process and the CSA of the fluorine-doped quartz glass lining tube is equal to the designed circular ring area of the depressed cladding layer of the core rod, the relative refraction index difference of the fluorine-doped depressed cladding layer deposited by the PCVD process is expressed with $\Delta_{301}$, wherein $\Delta_{301}<\Delta_{31}$, and $\Delta_{301}$ is between −0.2% and −0.6%.

In a class of this embodiment, for the pure quartz glass lining tube, before the deposition of the inner cladding layer, all fluorine-doped depressed cladding layers are deposited by the PCVD process, so that the CSA of the fluorine-doped depressed cladding layer deposited by the PCVD process is equal to a designed circular ring area of the depressed cladding layer of the core rod, the relative refraction index difference of the fluorine-doped depressed cladding layer deposited by the PCVD process is expressed with $\Delta_{302}$, and $\Delta_{302}$ is between −0.2% and −0.6%.

In a class of this embodiment, the method for directly depositing the pure $SiO_2$ glass outer cladding layer can adopt an OVD (outside vapor deposition) method, a VAD (vapor axial deposition) method, or an APVD (advanced plasma vapor deposition) method, and in the VAD or OVD method, the ratio c/a between the diameters of the core rod and the core layer is equal to or greater than 4.2; in the APVD method, the ratio c/a between the diameters of the core rod and the core layer is equal to or greater than 3.5.

In a class of this embodiment, the relative refraction index difference $\Delta_1$ of the core layer of the optical fiber preform is between 0.32 and 0.36%, and the relative refraction index difference $\Delta_2$ of the inner cladding layer of the optical fiber preform is between −0.07% and −0.02%.

In accordance with another embodiment of the invention, there provided is a method for manufacturing a bend-insensitive low-water-peak single mode optical fiber with high dynamic stress corrosion susceptibility parameter, comprising:

for optical fiber preforms manufactured by the RIC process, directly drawing the optical fiber preforms into fibers through a fiber drawing furnace, and during the fiber drawing process, performing vacuumization between the core rod and the jacketing tube, and maintaining the internal pressure between 1,000 and 10,000 pa; or melting and stretching the pure quartz glass jacketing tube and core rod into small-size preforms with diameter of 60-100 mm on a stretching tower, then performing fiber drawing in the fiber drawing furnace, during the melting and stretching process, performing vacuumization between the core rod and the casing tube, and maintaining the internal pressure between 1,000 and 10,000 pa; maintaining the fiber drawing speed of the fiber drawing furnace between 1,300 and 1,600 m/min, during the fiber drawing process, coating bare optical fibers with two layers of coatings, for the first coating, the modulus of the coating being between 0.8 and 1.5 MPa, and the glass transition temperature being between −55° C. and −35° C.; for the second coating, the modulus of the coating being between 900 and 1100 MPa, and the glass transition temperature being 60-80° C.

The smaller modulus and lower glass transition temperature are favorable for enhancing the bending properties of optical fibers, especially for the microbending properties, and meanwhile, the coating with specified modulus is adopted, thus the increase of microcracks on the surface of the bare optical fiber is effectively prevented, and the mechanical properties of optical fibers are enhanced. Under the higher modulus and higher glass transition temperature, better mechanical protection can be provided for optical fibers by the coating, and the adverse effects of the external environment and stress to optical fibers are effectively avoided. According to IEC60793-1-33, the dynamic stress corrosion susceptibility parameter $n_d$ value of optical fibers is measured by a two-point bending method. The two-point bending method is close to practical application, and the result is favorable for estimating the long-term minimum bending radius of optical fibers.

The optical fiber manufactured according to the technical scheme above has the following characteristics:

The mode field diameter of the optical fibers at 1310 nm wavelength is 8.4-9.2 μm;

The attenuation coefficient of the optical fibers at 1310 nm wavelength is equal to or smaller than 0.344 dB/km;

The attenuation coefficient of the optical fibers at 1383 nm wavelength is equal to or smaller than 0.324 dB/km;

The attenuation coefficient of the optical fibers at 1550 nm wavelength is equal to or smaller than 0.204 dB/km;

The attenuation coefficient of the optical fibers at 1625 nm wavelength is equal to or smaller than 0.214 dB/km;

For the optical fibers at 1625 nm wavelength, the additional bending loss is equal to or lower than 0.2 dB under the condition of 7.5 mm bending radius per turn;

For the optical fibers at 1625 nm wavelength, the additional bending loss is equal to or lower than 0.4 dB under the condition of 5.0 mm bending radius per turn;

The dynamic stress corrosion susceptibility parameter $n_d$ value of optical fibers is equal to or greater than 27;

The optic cable cutoff wavelength of optical fibers is equal to or smaller than 1260 nm;

The zero-dispersion wavelength of optical fibers is 1300 nm-1324 nm;

The slope of the zero-dispersion wavelength of optical fibers is equal to or lower than 0.092 ps/nm²*km.

Advantages of the invention are summarized below:

firstly, the effective diameter d of the optical fiber preform reaches 95-205 mm, the optical fiber preform is formed by sleeving the core rod and casing tube at one time or formed by directly depositing the outer cladding layer via the core rod, the preform has a simple structure, the fiber drawing length of a single preform can be up to more than 2,000 km, and the fiber drawing speed can be up to more than 1,300 m/min, so that the production efficiency is effectively improved, the production cost is reduced, and the optical fiber preform is simple and flexible in process, and particularly suitable for producing bend-resistant low-water-peak single mode optical fibers at a large scale;

secondly, the core layer in the optical fiber preform is far from the interface between the core rod and the casing tube or between the core rod and the outer cladding deposition layer, thus the sufficient cladding layer thickness can effectively prevent the hydroxyl group and impurity from diffusing towards the core layer, which is favorable for decreasing the attenuation value at the low water peak and optimizing the attenuation property of optical fibers, and ensures the low water peak property and low attenuation property of optical fibers;

thirdly, by adopting the fluorine-doped quartz glass lining tube and the PCVD process, the design of the depressed cladding layer can be realized, the optical loss induced by the bending of optical fibers is effectively reduced, and in the preform, a unique interface only exists between the surface of the core rod and the inner wall of the jacketing tube or the deposited outer cladding layer, thus the probability of forming a defect on the interface can be effectively reduced, the number of defects is reduced, and because the optical fiber outer layer is coated with coatings with specified modulus, the dynamic stress corrosion susceptibility parameter $n_d$ value of optical fibers is obviously improved, the mechanical properties and strength of optical fibers are improved and enhanced, and the optical bending resistance and mechanical bending resistance of optical fibers are further optimized;

fourthly, under the bending radius of 7.5 mm or 5.0 mm, the optical fiber at the wavelength 1625 nm has small additional bending loss at 0.2 dB/turn and 0.4 dB/turn and even smaller additional bending loss, thus the optical fiber is particularly suitable for the situation where the bending radius is small, for example, the optical fiber is used in an optical fiber access network (FTTx) or a miniature optical device, and meanwhile, the optical fiber maintains compatibility with G.652 optical fibers; and Finally, the manufacture scheme of the optical fiber preform is not just limited in G.657 optical fibers, and can be used for producing other types of optical fibers with fluorine-doped depressed cladding layer structures, for example, G.652 optical fibers or multi-mode optical fibers.

DETAILED DESCRIPTION OF THE EMBODIMENTS

Example 1

Figure 1:
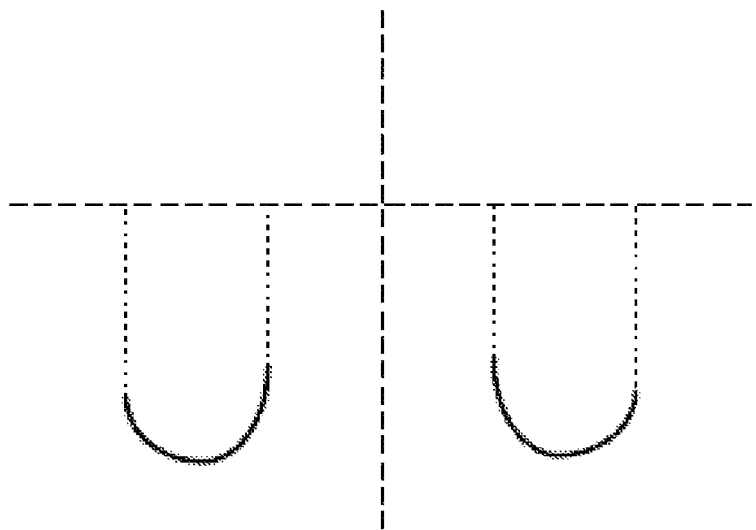
FIGS. 1-5 are diagrams of the refractive-index profile of a fluorine-doped quartz glass lining tube in accordance with one embodiment of the invention.
Figure 2:
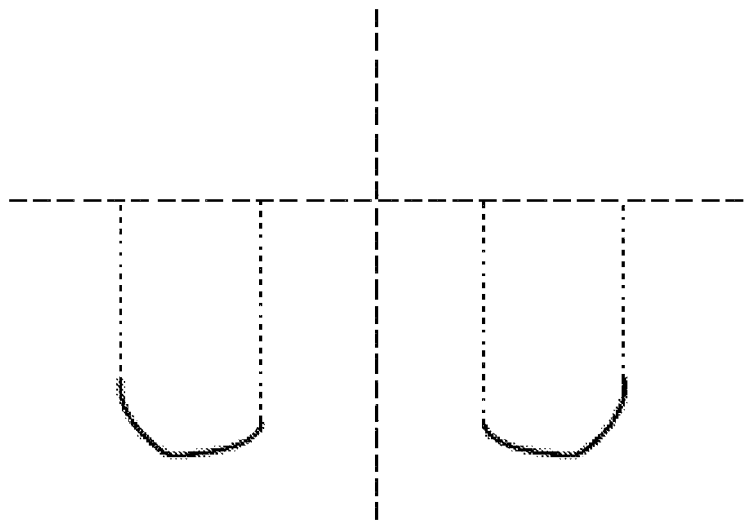
Figure 3:
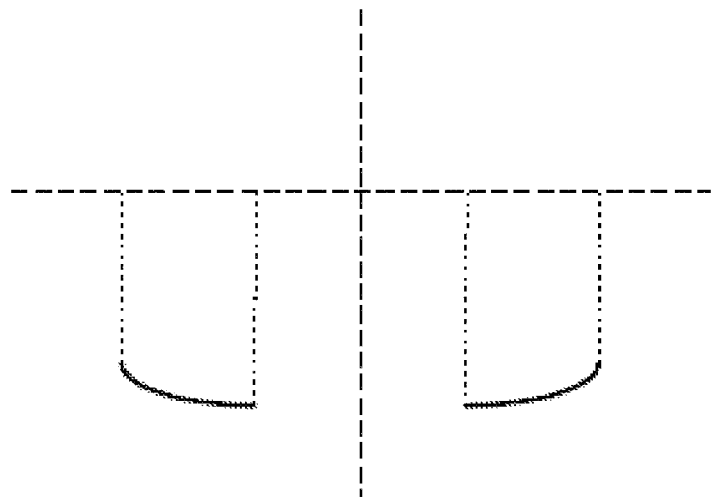
Figure 4:
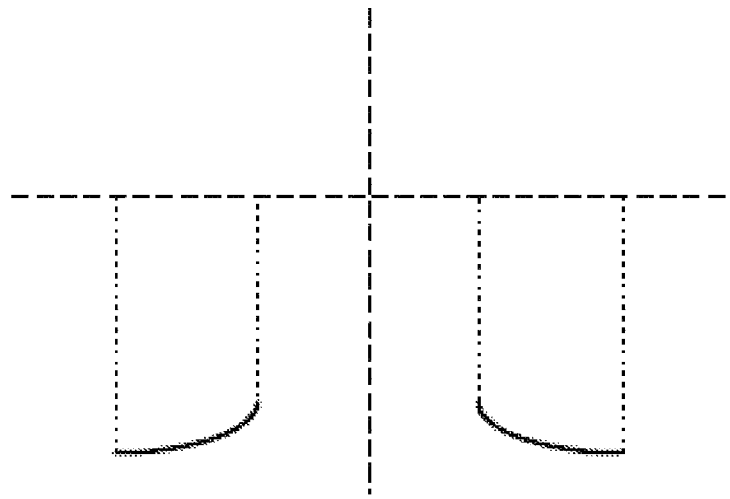
Figure 5:
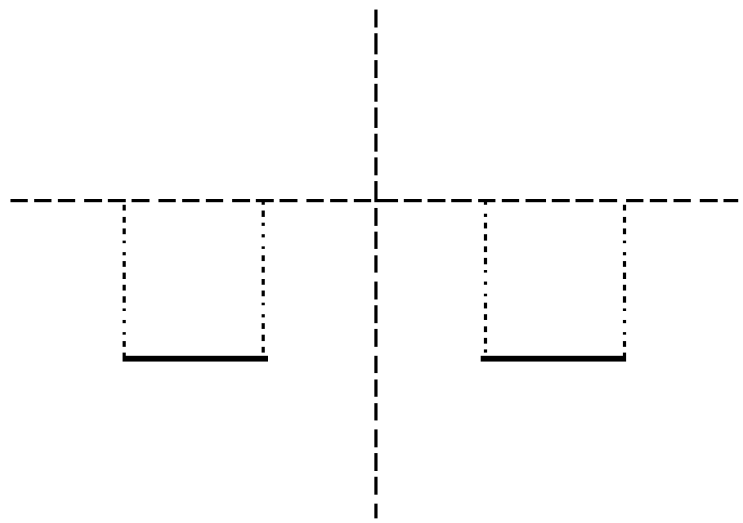
Figure 6:
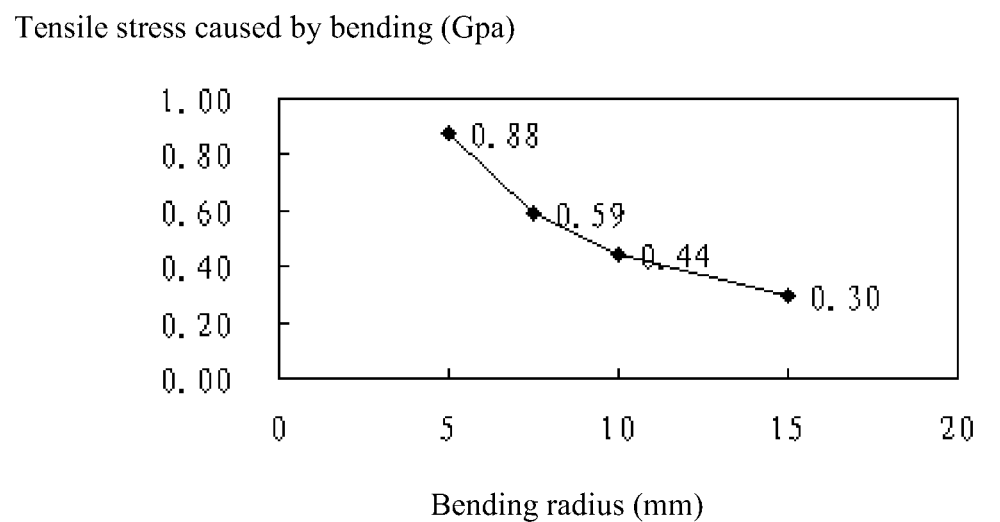
FIG. 6 is a relationship diagram between the bending radius of optical fibers and the tensile stress caused by the bending radius.

Optical fiber core rods are prepared with the PCVD process, the used lining tube is a fluorine-doped quartz glass lining tube and prepared with the OVD process. The fluorine-doped quartz glass lining tube is cleaned and fully dried before deposition. The deposited fluorine-doped quartz glass lining tube is melt-contracted into a solid core rod in an electric heating furnace. The core rod is assembled into a preform with a high-purity quartz tube by an RIC process after corrosion, cleaning, and drying, and the main parameters of the preform are shown in Table 1.

TABLE 1

Parameters of optical fiber preform of Example 1

| | Parameter of core rod and optical fiber preform | | | | | | Fluorine-doped lining tube | | | | | Jacketing tube | |
|---|---|---|---|---|---|---|---|---|---|---|---|---|---|
| ID | $\Delta_1$ (%) | $\Delta_2$ (%) | a (mm) | b (mm) | c (mm) | d (mm) | Hydroxyl content (ppm) | $\Delta_{31}$ (%) | $\Delta_{32}$ (%) | Aperture of inner hole (mm) | CSA (mm$^2$) | ID (mm) | OD (mm) |
| 1 | 0.328 | −0.055 | 9.6 | 21.7 | 42 | 150.5 | 0.08 | −0.21 | −0.3 | 29 | 1025 | 43.5 | 151 |
| 2 | 0.355 | −0.025 | 6.55 | 13 | 27 | 100 | 0.06 | −0.24 | −0.32 | 25 | 450 | 28.5 | 100.5 |
| 3 | 0.348 | −0.03 | 9.3 | 21.3 | 39 | 150 | 0.05 | −0.26 | −0.2 | 28 | 850 | 41 | 150.5 |
| 4 | 0.35 | −0.06 | 9.78 | 22 | 38 | 149.5 | 0.01 | −0.32 | −0.3 | 28.5 | 770 | 40 | 150 |
| 5 | 0.355 | −0.02 | 9.35 | 22.6 | 43 | 150 | 0.10 | −0.26 | −0.22 | 29 | 1065 | 45 | 151.5 |
| 6 | 0.32 | −0.06 | 9.53 | 22.5 | 42.5 | 149 | 0.05 | −0.22 | −0.32 | 29 | 1045 | 44 | 150 |
| 7 | 0.334 | −0.05 | 9.7 | 22.8 | 45 | 150 | 0.03 | −0.23 | −0.27 | 30 | 1210 | 47 | 151 |
| 8 | 0.335 | −0.045 | 7.42 | 16.3 | 31 | 120 | 0.05 | −0.24 | −0.27 | 25 | 560 | 34 | 121 |
| 9 | 0.342 | −0.035 | 11.2 | 25.8 | 45 | 175 | 0.06 | −0.23 | −0.28 | 32 | 1085 | 47 | 176 |
| 10 | 0.333 | −0.052 | 12.5 | 28.3 | 55.3 | 200.5 | 0.05 | −0.24 | −0.29 | 34 | 1800 | 58 | 201 |

The preform is directly drawn, two layers of the optical fiber coating materials are adopted, the fiber drawing speed is 1,500 m/min, the fiber diameter of optical fibers is 125±0.7 μm, and the internal pressure in the RIC process is controlled between 1,000 pa and 10,000 pa. The main performance parameters of the drawn optical fibers are shown in Table 2.

TABLE 2

Main performance parameters of optical fiber of Example 1

| | Mode field diameter | | Optic cable cutoff | Attenuation coefficient (dB/km) | | | |
|---|---|---|---|---|---|---|---|
| ID | @1310 nm (μm) | $n_d$ | wavelength (nm) | 1310 nm | 1383 nm | 1550 nm | 1625 nm |
| 1 | 8.75 | 28 | 1246 | 0.332 | 0.319 | 0.192 | 0.202 |
| 2 | 8.9 | 30 | 1254 | 0.334 | 0.308 | 0.195 | 0.205 |
| 3 | 8.5 | 29 | 1235 | 0.338 | 0.298 | 0.196 | 0.207 |
| 4 | 9.05 | 31 | 1255 | 0.340 | 0.283 | 0.192 | 0.199 |
| 5 | 8.45 | 27 | 1233 | 0.342 | 0.326 | 0.198 | 0.21 |
| 6 | 8.73 | 29 | 1244 | 0.333 | 0.299 | 0.188 | 0.199 |
| 7 | 9.12 | 32 | 1256 | 0.332 | 0.291 | 0.19 | 0.2 |
| 8 | 8.67 | 29 | 1238 | 0.329 | 0.301 | 0.19 | 0.202 |
| 9 | 8.8 | 28 | 1248 | 0.335 | 0.307 | 0.195 | 0.205 |
| 10 | 8.69 | 27 | 1245 | 0.333 | 0.298 | 0.191 | 0.203 |

| | Zero-dispersion | Slope of the zero-dispersion | Bending induced loss @1625 nm (dB/turn) | |
|---|---|---|---|---|
| ID | wavelength (nm) | wavelength (ps/nm$^2$ * km) | Φ10 mm | Φ15 mm |
| 1 | 1310 | 0.089 | 0.28 | 0.15 |
| 2 | 1306 | 0.091 | 0.33 | 0.16 |
| 3 | 1313 | 0.087 | 0.22 | 0.10 |
| 4 | 1308 | 0.09 | 0.19 | 0.1 |
| 5 | 1314 | 0.086 | 0.2 | 0.1 |
| 6 | 1310 | 0.090 | 0.28 | 0.15 |
| 7 | 1312 | 0.089 | 0.3 | 0.18 |
| 8 | 1310 | 0.089 | 0.23 | 0.13 |
| 9 | 1309 | 0.091 | 0.27 | 0.15 |
| 10 | 1311 | 0.088 | 0.25 | 0.14 |

The CSA of the fluorine-doped quartz glass lining tube meets the designed circular ring area of a depressed cladding layer of the core rod. Thus, the inner cladding layer and the core layer can be directly deposited by the PCVD process.

Figure 7:
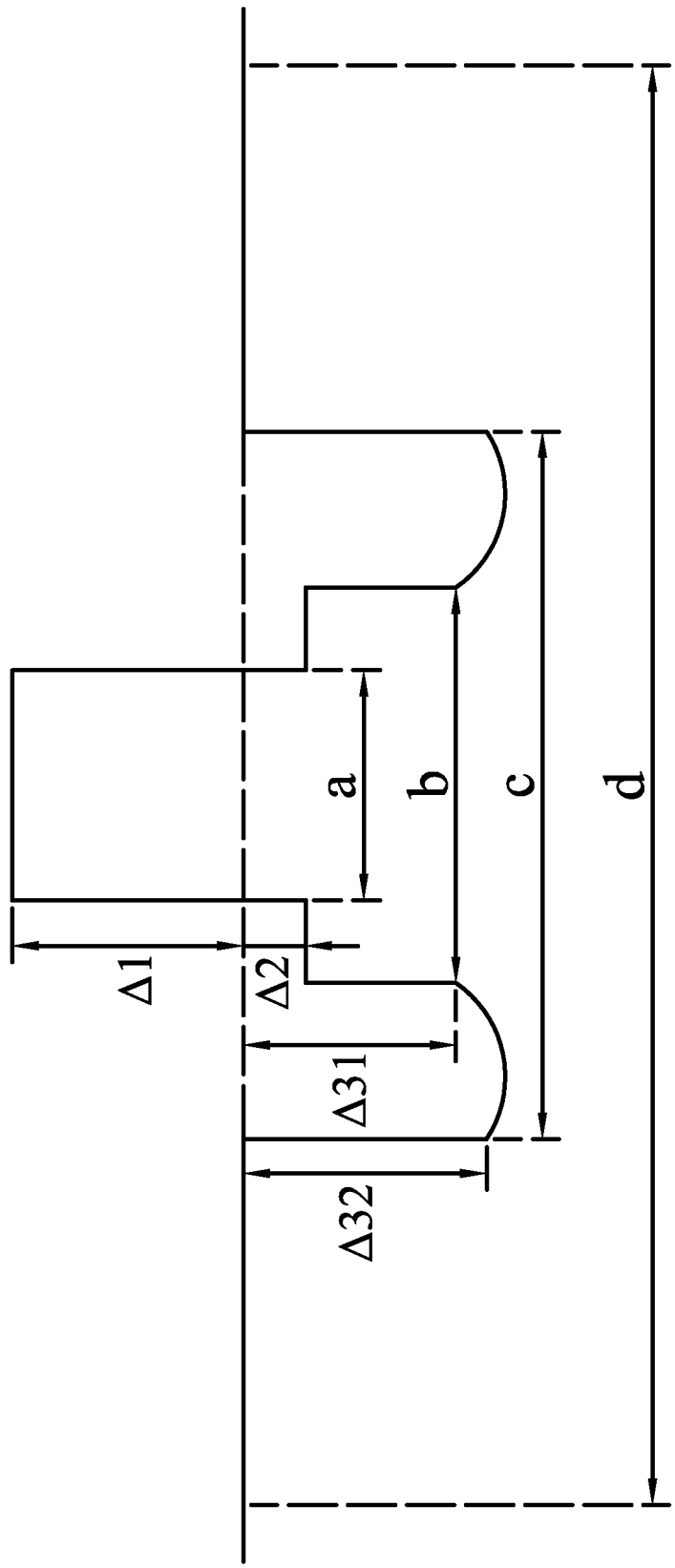
FIG. 7 is a diagram of the refractive-index profile of a preform of one embodiment of the invention.
Figure 11:
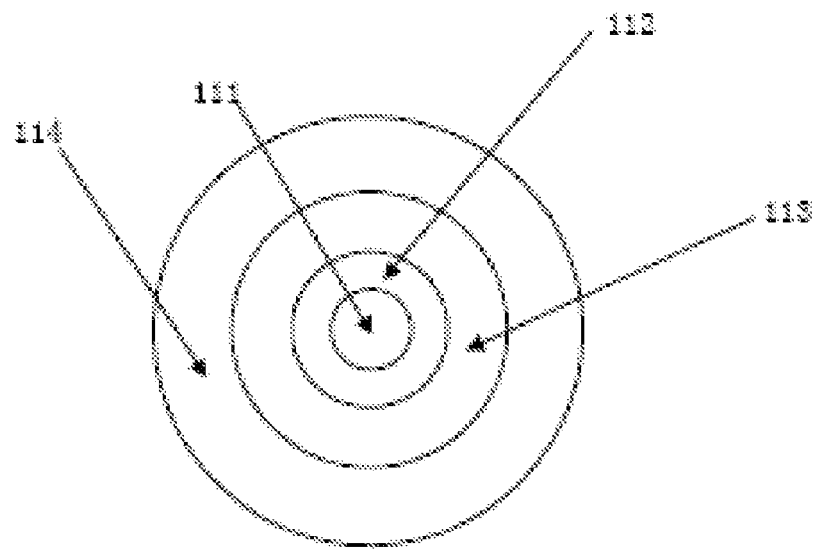
FIG. 11 is a first section diagram of a core rod of the invention; Legends: 111. core layer deposited by the PCVD process; 112. inner cladding layer deposited by the PCVD process; 113. fluorine-doped quartz glass lining tube; and 114. jacketing tube.

The diagram of the refractive-index profile of the preform is shown in FIG. 7, and the section diagram of the core rod is shown in FIG. 11.

Based on the PCVD process and compared with the prior art, Example 1 has the advantages that on the aspect of glass raw materials, the use of a lining tube is directly reduced; on the aspect of equipment, melting contraction of primary core rods is reduced, that is, the occupied amount of a melting contraction lathe is reduced; on the aspect of process treatment, the steps of corrosion, cleaning and drying of lower-water-peak core rods are reduced, and the consumption of corresponding equipment, raw materials and man power is directly reduced. Meanwhile, the attenuation properties, mechanical properties, bending properties and other key parameters of optical fibers are also optimized.

Example 2

Figure 16:
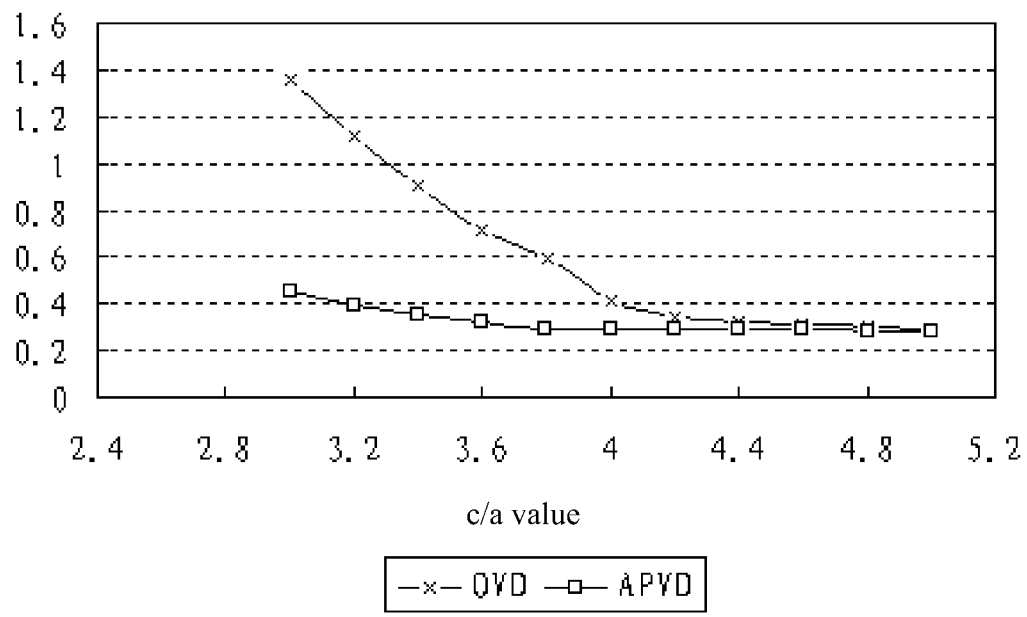
FIG. 16 is a relation curve between the c/a of core rods and the water peak attenuation of optical fibers during the process of manufacturing an outer cladding layer by the OVD process and APVD process.

During the deposition of an outer cladding layer manufactured by the OVD or VAD process, the pollution to the hydroxyl group of the core rod is obvious due to the use of $H_2/O_2$ flame. When the APVD process is adopted, not only the hydroxyl content of the deposited glass is higher, but also the hydroxyl group in the environment is also absorbed on a target rod and diffused inward; once the hydroxyl group is diffused to the core layer of the core rod, the increase in water peak of the optical fiber will occur, and it mainly determines the diffusion distance and diffusion coefficient whether the hydroxyl group is diffused inward to the core layer of the core rod. The method of increasing the diffusion distance is to increase the c/a value of the core rod. Core rods with different c/a values are manufactured by the same method in the Example 1, outer cladding layers are manufactured by the OVD process and APVD process, and preforms with outer diameter of 145-155 mm are manufactured and then drawn into optical fibers. The diameter of bare optical fibers is 125±0.7 μm, and the relationship between the water peak attenuation of optical fibers and the c/a of core rods is shown in FIG. 16. By adopting the technology of the invention, the outer cladding is manufactured by the OVD or APVD process, and the optical fiber preforms and optical fibers which meet the ITU-T G.652.D and G.657 standards respectively can also be obtained; the VAD process of manufacturing the cladding has the same mechanism as the OVD process, thus the c/a of the core rods should be equal to or greater than 4.2 for the OVD or VAD cladding; for the APVD cladding, the c/a of the core rods should be equal to or greater than 3.5.

Example 3

Optical fiber core rods are manufactured by the PCVD process. The used lining tube is a fluorine-doped quartz glass lining tube and prepared with the OVD process. The fluorine-doped quartz glass lining tube is cleaned and fully dried before deposition. The deposited fluorine-doped quartz glass lining tube is melt-contracted into a solid core rod in an electric heating furnace. The core rod is assembled into a preform with a high-purity quartz tube by an RIC process after corrosion, cleaning, and drying, and the main parameters of the preform are shown in Table 3.

TABLE 3

Parameters of optical fiber preform of Example 3

| | Core rod parameter | | | | | | Fluorine-doped depressed cladding layer deposited by the PCVD |
|---|---|---|---|---|---|---|---|
| ID | Δ1 (%) | Δ2 (%) | a (mm) | b (mm) | c (mm) | d (mm) | $\Delta_{301}$ (%) |
| 1 | 0.332 | −0.043 | 6.28 | 14.9 | 26 | 99.5 | −0.25 |
| 2 | 0.321 | −0.058 | 7.7 | 17.2 | 32 | 119.5 | −0.32 |
| 3 | 0.338 | −0.03 | 9.5 | 22.3 | 37 | 150 | −0.5 |
| 4 | 0.345 | −0.03 | 9.37 | 21.6 | 42.5 | 149.5 | −0.26 |
| 5 | 0.328 | −0.055 | 9.48 | 21.2 | 42 | 149.5 | −0.22 |
| 6 | 0.336 | −0.05 | 11.25 | 25.5 | 45 | 181 | −0.27 |
| 7 | 0.333 | −0.056 | 12.6 | 29 | 57 | 200 | −0.3 |

| | Fluorine-doped silica glass lining tube | | | | | Jacketing tube | |
|---|---|---|---|---|---|---|---|
| ID | Hydroxyl content (ppm) | $\Delta_{31}$ (%) | $\Delta_{32}$ (%) | Aperture of inner hole (mm) | CSA (mm$^2$) | ID (mm) | OD (mm) |
| 1 | 0.05 | −0.24 | −0.28 | 26 | 290 | 28.5 | 100.5 |
| 2 | 0.04 | −0.23 | −0.29 | 28 | 480 | 35 | 121 |
| 3 | 0.05 | −0.23 | −0.28 | 32 | 600 | 40 | 151 |
| 4 | 0.04 | −0.27 | −0.23 | 32 | 950 | 45 | 150 |
| 5 | 0.05 | −0.26 | −0.24 | 32 | 910 | 44.5 | 150 |
| 6 | 0.05 | −0.25 | −0.22 | 35 | 960 | 47 | 182 |
| 7 | 0.06 | −0.26 | −0.24 | 40 | 1700 | 60 | 201 |

The RIC process preform is directly drawn, two layers of optical fiber coating materials are adopted, the fiber drawing speed is 1,500 m/min, the fiber diameter of optical fibers is 125±0.7 μm, and the internal pressure in the RIC process is controlled between 1,000 pa and 10,000 pa. The main performance parameters of the drawn optical fibers are shown in Table 4.

TABLE 4

Main performance parameters of optical fiber of Example 3

| | Mode field diameter @1310 nm | | | Attenuation coefficient (dB/km) | | | |
|---|---|---|---|---|---|---|---|
| ID | (μm) | $n_d$ | Optic cable cutoff wavelength (nm) | 1310 nm | 1383 nm | 1550 nm | 1625 nm |
| 1 | 8.68 | 27 | 1247 | 0.333 | 0.304 | 0.191 | 0.201 |
| 2 | 8.7 | 28 | 1233 | 0.331 | 0.301 | 0.190 | 0.199 |
| 3 | 8.65 | 28 | 1241 | 0.338 | 0.302 | 0.195 | 0.206 |
| 4 | 8.48 | 31 | 1249 | 0.340 | 0.298 | 0.194 | 0.205 |
| 5 | 8.63 | 29 | 1244 | 0.337 | 0.303 | 0.193 | 0.203 |
| 6 | 8.72 | 28 | 1243 | 0.334 | 0.299 | 0.188 | 0.198 |
| 7 | 9.12 | 30 | 1246 | 0.332 | 0.305 | 0.191 | 0.201 |

TABLE 4-continued

Main performance parameters of optical fiber of Example 3

| ID | Zero-dispersion wavelength (nm) | Slope of the zero-dispersion wavelength (ps/nm$^2$ * km) | Bending induced loss @1625 nm (dB/turn) Φ10 mm | Bending induced loss @1625 nm (dB/turn) Φ15 mm |
|---|---|---|---|---|
| 1 | 1310 | 0.089 | 0.27 | 0.13 |
| 2 | 1311 | 0.088 | 0.25 | 0.14 |
| 3 | 1312 | 0.089 | 0.12 | 0.04 |
| 4 | 1313 | 0.087 | 0.14 | 0.07 |
| 5 | 1310 | 0.090 | 0.16 | 0.08 |
| 6 | 1309 | 0.090 | 0.29 | 0.18 |
| 7 | 1306 | 0.092 | 0.3 | 0.2 |

The CSA of the deposited fluorine-doped quartz glass lining tube is smaller than a designed circular ring area of a depressed cladding layer of the core rod. Thus, some fluorine-doped depressed cladding layers are required to be deposited before the deposition of the inner cladding layer and core layer by the PCV process, the sum between the CSA of the fluorine-doped depressed cladding layer deposited by the PCVD process and the CSA of the fluorine-doped quartz glass lining tube is equal to the designed circular ring area of the depressed cladding layer of the core rod, and then the inner cladding layer and core layer are deposited in sequence.

Figure 8:
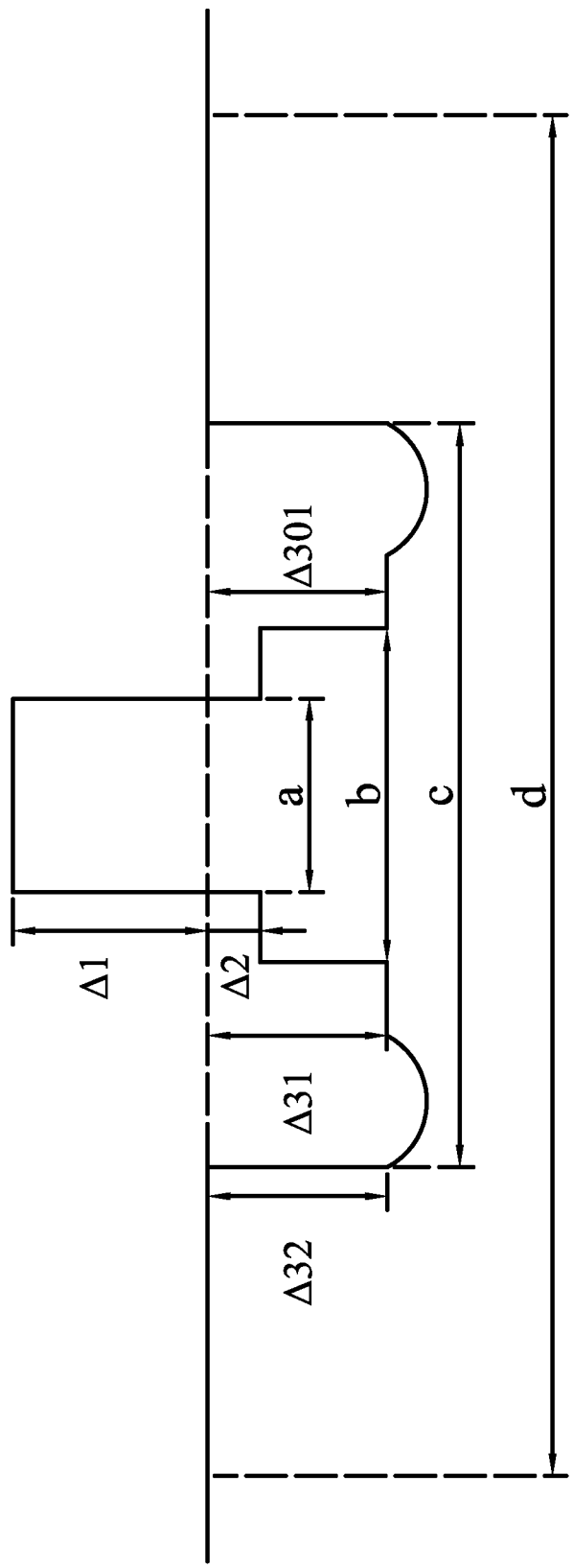
FIG. 8 is a diagram of the refractive-index profile of a preform of another embodiment of the invention.
Figure 12:
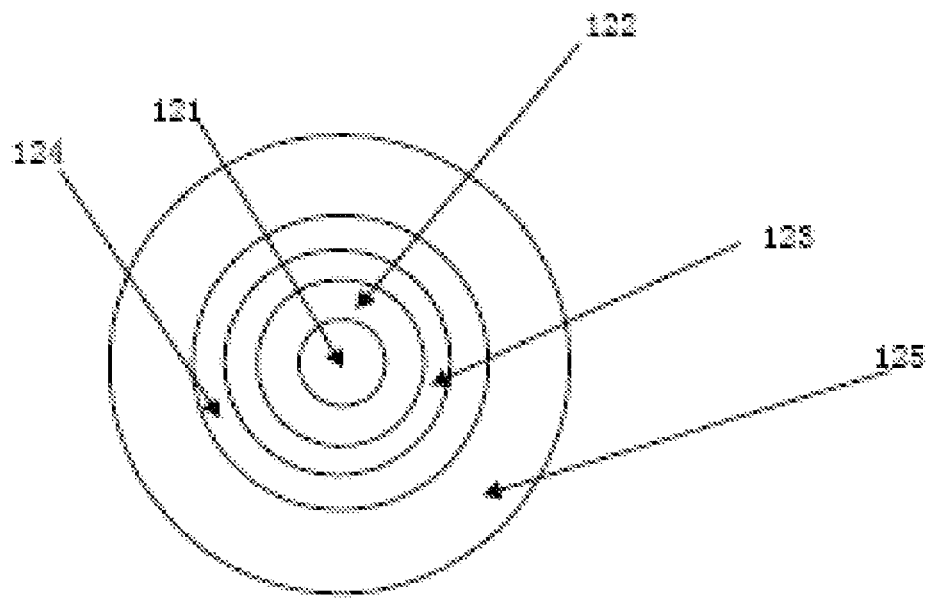
FIG. 12 is a second section diagram of a core rod of the invention; Legends: 121. core layer deposited by a PCVD process; 122. inner cladding layer deposited by the PCVD process; 123. fluorine-doped depressed cladding layer; 124. fluorine-doped quartz glass lining tube; and 125. jacketing tube.

The diagram of the refractive index profile of the preform is shown in FIG. 8, and the section diagram of the core rod is shown in FIG. 12.

As shown in the example, when the CSA of the fluorine-doped quartz glass lining tube cannot meet a designed circular ring area of the depressed cladding layer of the core rod, the depressed cladding layer can be directly deposited by the PCVD process, and the sum between the depressed cladding layer deposited by the PCVD process and the CSA of the fluorine-doped quartz glass lining tube is equal to the designed circular ring area of the depressed cladding layer in the core rod. For the optical fibers manufactured by adopting the technical scheme in Example 3, the bending resistance can fully meet the index requirements in G.657 optical fiber standards in ITU-T.

Example 4

Optical fiber core rods are manufactured by the PCVD process. The used lining tube is a pure quartz glass lining tube and prepared with the OVD process, and the pure quartz glass lining tube is cleaned and fully dried before deposition. Based on the lining tube, the fluorine-doped depressed cladding layer, inner cladding layer, and core layer are deposited in sequence by the PCVD process. The deposited lining tube is melt-contracted into a solid core rod in an electric heating furnace. The core rod is assembled into a preform with a high-purity quartz tube by an RIC process after corrosion, cleaning, and drying, and the main parameters of the preform are shown in Table 5.

TABLE 5

Parameters of optical fiber preform of Example 4

| | Core rod parameter | | | | | | Fluorine-doped depressed cladding layer deposited by the PCVD |
|---|---|---|---|---|---|---|---|
| ID | Δ1 (%) | Δ2 (%) | a (mm) | b (mm) | c (mm) | d (mm) | Δ$_{302}$ (%) |
| 1 | 0.333 | −0.05 | 6.35 | 14.4 | 24 | 99.5 | −0.25 |
| 2 | 0.322 | −0.062 | 7.68 | 17.7 | 29 | 119.5 | −0.26 |
| 3 | 0.337 | −0.04 | 9.44 | 22.1 | 36 | 150 | −0.28 |
| 4 | 0.343 | −0.03 | 9.37 | 21.2 | 33.5 | 149.5 | −0.35 |
| 5 | 0.332 | −0.054 | 9.58 | 21.6 | 32.2 | 149.5 | −0.54 |
| 6 | 0.338 | −0.045 | 11.23 | 25.2 | 43.5 | 181 | −0.27 |
| 7 | 0.333 | −0.055 | 12.55 | 29 | 48 | 200 | −0.28 |

| | Highly pure silica glass lining tube | | | Jacketing tube | |
|---|---|---|---|---|---|
| | Hydroxyl content (ppm) | Outer diameter (mm) | Wall thickness (mm) | ID (mm) | OD (mm) |
| 1 | 0.06 | 46 | 3 | 32 | 100 |
| 2 | 0.05 | 46 | 2.5 | 35 | 120 |
| 3 | 0.04 | 49 | 2.5 | 43 | 151 |
| 4 | 0.05 | 47 | 3 | 42 | 150 |
| 5 | 0.03 | 46 | 3.5 | 42 | 150 |
| 6 | 0.05 | 51 | 2 | 50 | 182.5 |
| 7 | 0.06 | 54 | 3 | 56 | 201.5 |

The RIC process preform is directly drawn, two layers of optical fiber coating materials are adopted, the fiber drawing speed is 1,500 m/min, the fiber diameter of optical fibers is 125±0.7 μm, and the internal pressure in the RIC process is controlled between 1,000 pa and 10,000 pa. The main performance parameters of the drawn optical fibers are shown in Table 6.

TABLE 6

Main performance parameters of optical fiber of Example 4

| | Mode field diameter @1310 nm | | Optic cable cutoff | Attenuation coefficient (dB/km) | | | |
|---|---|---|---|---|---|---|---|
| ID | (μm) | n$_d$ | wavelength (nm) | 1310 nm | 1383 nm | 1550 nm | 1625 nm |
| 1 | 8.65 | 28 | 1235 | 0.332 | 0.304 | 0.192 | 0.202 |
| 2 | 8.69 | 27 | 1240 | 0.330 | 0.301 | 0.191 | 0.201 |
| 3 | 8.66 | 29 | 1239 | 0.339 | 0.302 | 0.194 | 0.205 |

TABLE 6-continued

Main performance parameters of optical fiber of Example 4

| 4 | 8.52 | 30 | 1236 | 0.340 | 0.298 | 0.193 | 0.204 |
| 5 | 8.64 | 29 | 1241 | 0.335 | 0.288 | 0.192 | 0.203 |
| 6 | 8.74 | 27 | 1252 | 0.333 | 0.299 | 0.189 | 0.198 |
| 7 | 9.13 | 29 | 1254 | 0.331 | 0.305 | 0.19  | 0.201 |

| ID | Zero-dispersion wavelength (nm) | Slope of the zero-dispersion wavelength (ps/nm$^2$ * km) | Bending induced loss @1625 nm (dB/turn) Φ10 mm | Φ15 mm |
|---|---|---|---|---|
| 1 | 1309 | 0.090 | 0.23 | 0.11 |
| 2 | 1312 | 0.087 | 0.21 | 0.1 |
| 3 | 1311 | 0.088 | 0.21 | 0.11 |
| 4 | 1313 | 0.087 | 0.13 | 0.07 |
| 5 | 1311 | 0.090 | 0.1 | 0.04 |
| 6 | 1309 | 0.091 | 0.25 | 0.14 |
| 7 | 1305 | 0.092 | 0.26 | 0.15 |

The fluorine-doped depressed cladding layer is deposited by the PCVD process, so that the CSA of the fluorine-doped depressed cladding layer is equal to the designed circular ring area of a depressed cladding layer in the core rod, and then the inner cladding layer and core layer are deposited in sequence.

Figure 9:
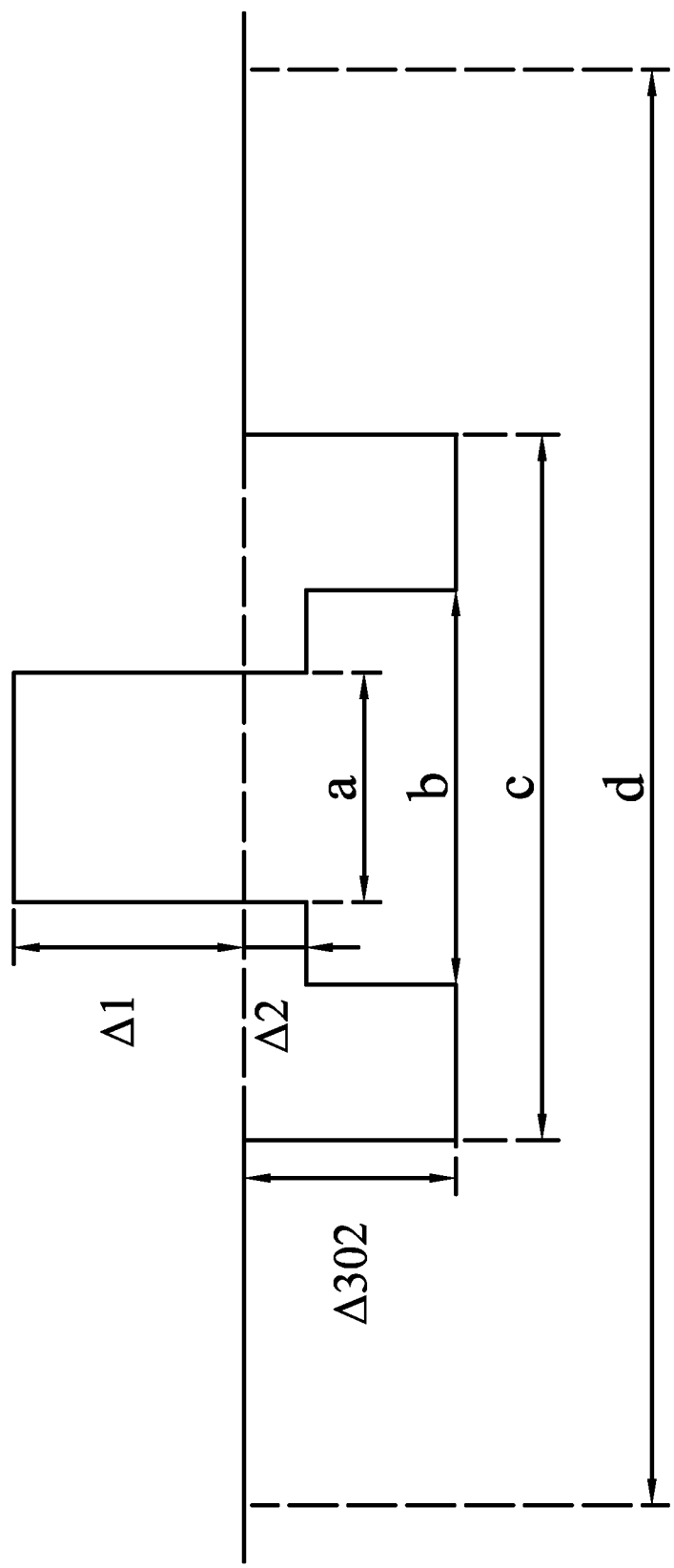
FIG. 9 is a diagram of refractive-index profile of a preform of a third embodiment of the invention.
Figure 10:
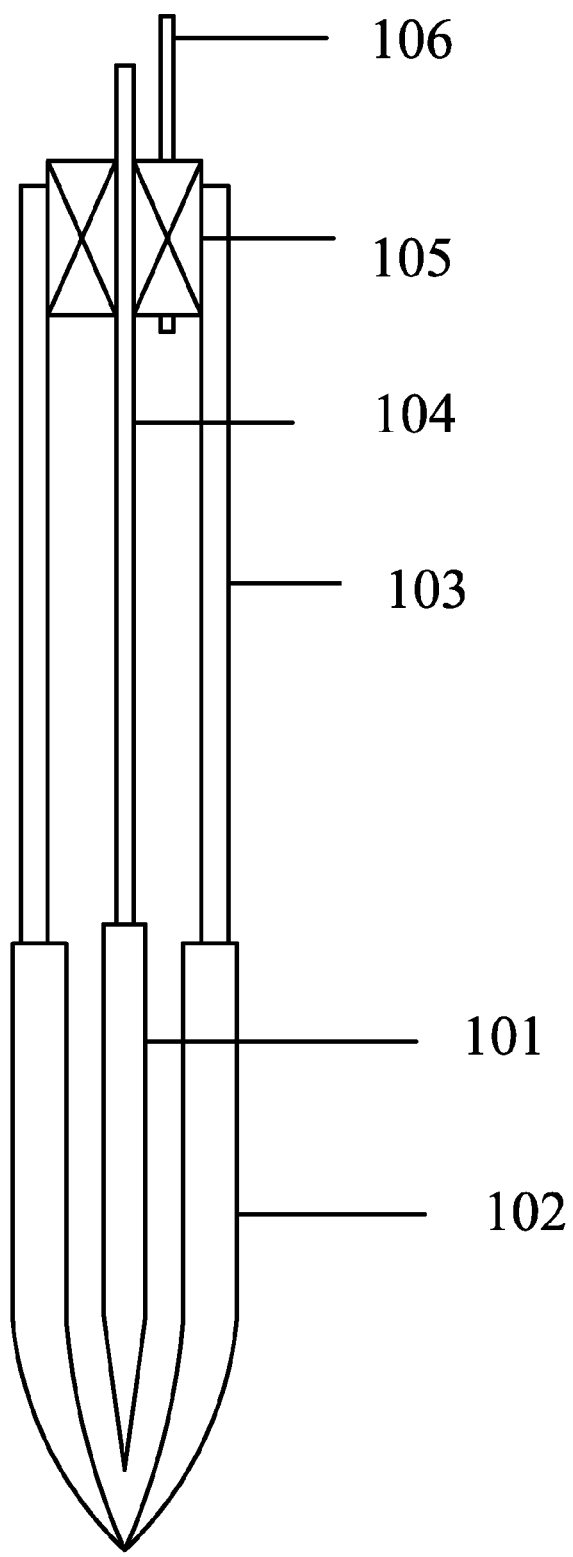
FIG. 10 is a diagram of a preform manufactured by a RIC process; Legends: 101. core rod; 102. jacketing tube; 103. extension tube of the jacketing tube; 104. extension rod of the core rod; 105. end plug of the preform manufactured by the RIC process; and 106. air pressure control port.
Figure 13:
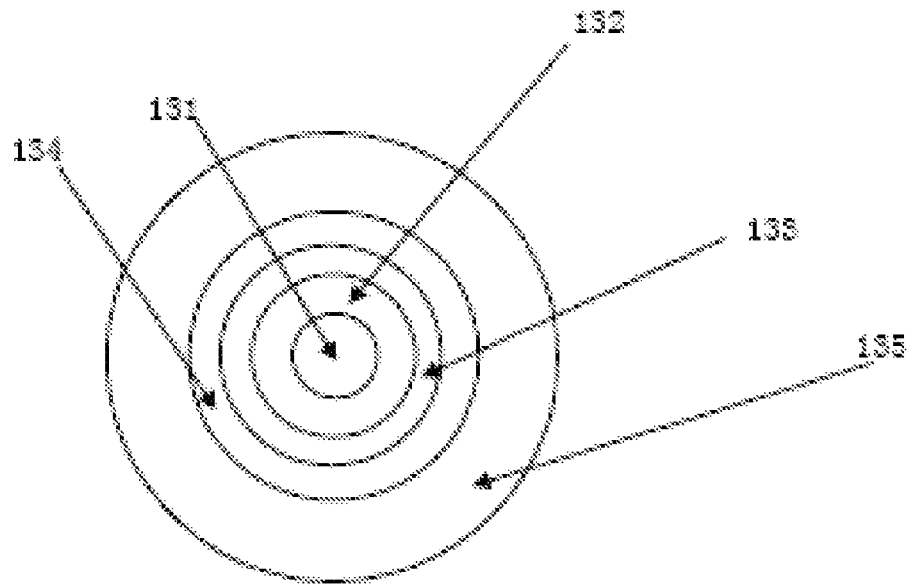
FIG. 13 is a third section diagram of a core rod of the invention; Legends: 131. core layer deposited by the PCVD process; 132. inner cladding layer deposited by the PCVD process; 133. fluorine-doped depressed cladding layer deposited by the PCVD process; 134. pure quartz glass lining tube; and 135. jacketing tube.
Figure 14:
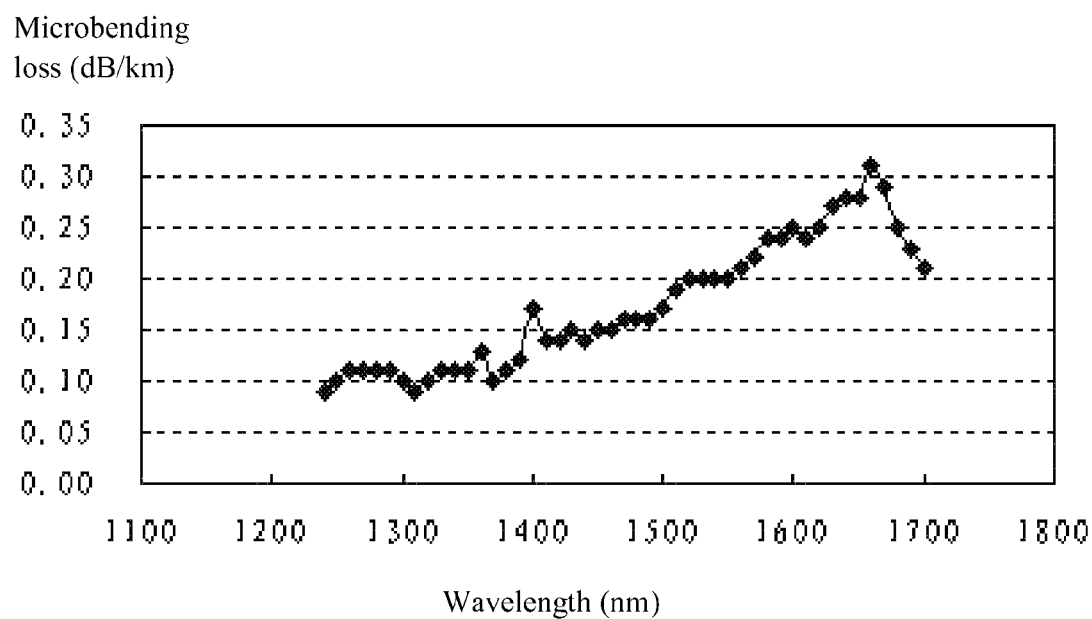
FIG. 14 is an attenuation spectrum of microbending loss of an optical fiber of the invention.
Figure 15:
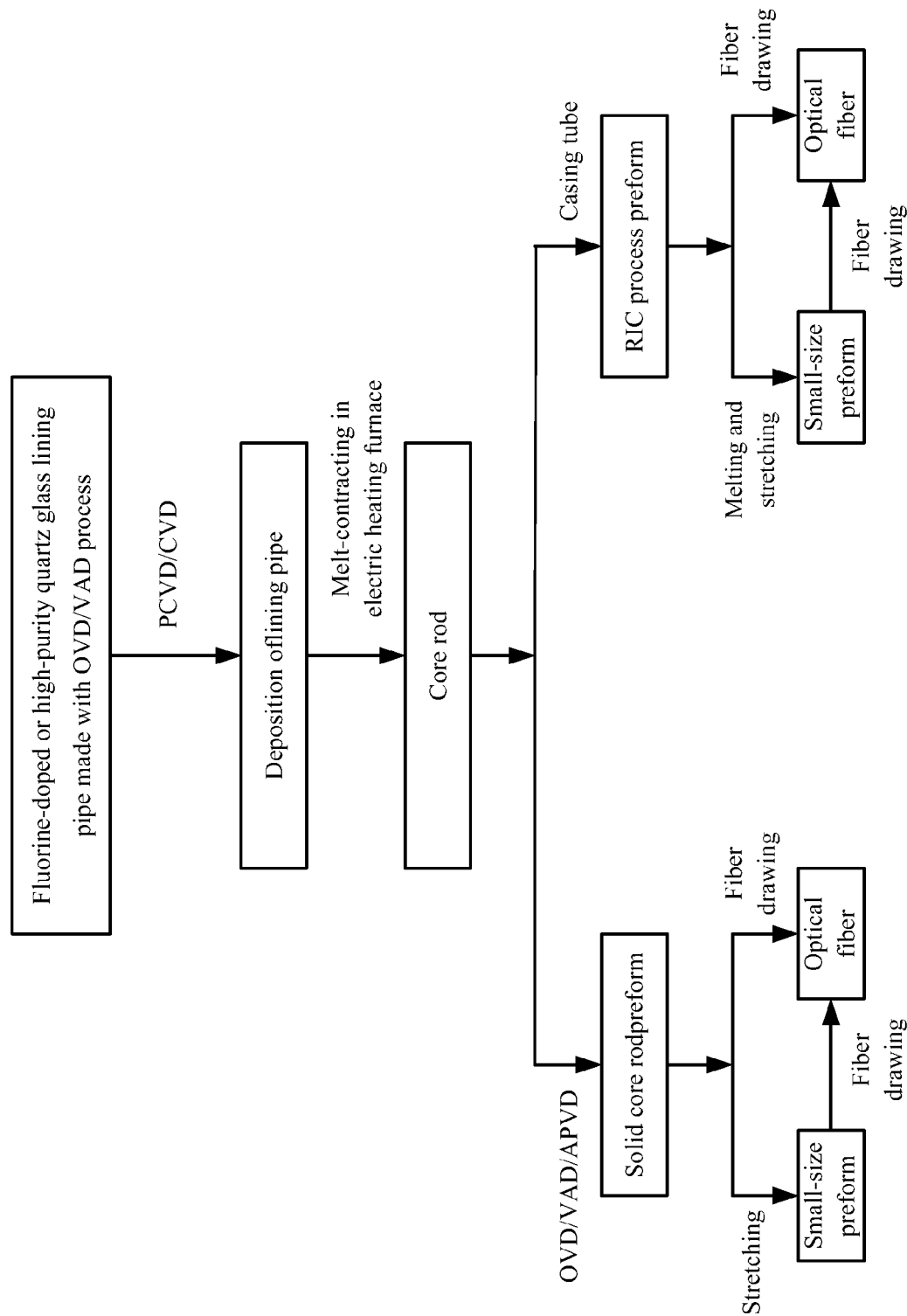
FIG. 15 is a manufacturing process flowchart of a preform and optical fiber of the invention.

The diagram of the refractive index profile of the preform is shown in FIG. 9, and the section diagram of the core rod is shown in FIG. 13.

The fluorine-doped depressed cladding layer is deposited by the PCVD process, thus the design requirements of the core rod are realized, and the bending resistance of the drawn optical fibers can also fully meet the requirements in G.657 optical fiber standards in ITU-T.

The results of Examples 1-4 show that by adopting the technical scheme of the invention, the optical fiber preforms with diameter greater than 100 mm can be manufactured, the fiber drawing speed can be up to more than 1,300 m/min, the drawn optical fibers fully meet the ITU-T G.652.D and G.657 standards, and the optical fiber has the characteristics of low water peak, high dynamic stress corrosion susceptibility parameter, and small macrobending additional loss.

The invention claimed is:

1. A method for manufacturing an optical fiber preform, the method comprising:
   a) providing a lining tube as a substrate tube, the lining tube being a pure quartz glass lining tube; the pure quartz glass lining tube having an outer diameter between 45-55 mm, a wall thickness between 2-4 mm, and a hydroxyl content being equal to or smaller than 0.10 ppm;
   b) doping and depositing by a plasma chemical vapor deposition (PCVD) or modified chemical vapor deposition (MCVD) process, comprising transporting a reacting gas comprising silicon tetrachloride and oxygen into the lining tube of a), introducing a fluorine-containing gas into the reacting gas for fluorine doping, introducing germanium tetrachloride into the reacting gas for germanium doping, ionizing the reacting gas, the fluorine-containing gas, and the germanium tetrachloride in the lining tube through microwaves to form plasma, depositing on an inner wall of the lining tube a glass, and according to doping requirements of a waveguide structure of optical fiber, changing flow rates of the fluorine-containing gas and the germanium tetrachloride introduced into the reacting gas to deposit a depressed cladding layer, an inner cladding layer, and a core layer in sequence to obtain a deposited lining tube;
   c) after the completion of deposition, processing the deposited lining tube of b) into a solid core rod by melt contraction through an electric heating furnace;
   d) sleeving the solid core rod of c) into a pure quartz glass jacketing tube to produce an optical fiber preform, a difference between a diameter of an inner hole of the pure quartz glass jacketing tube and a diameter of the solid core rod being between 1.5 and 4 mm; or directly depositing a pure SiO$_2$ glass outer cladding layer on the core rod to obtain the optical fiber preform; and
   e) allowing an effective diameter (d) of the optical fiber preform obtained in d) to be between 95 and 205 mm.

2. The method of claim 1, wherein after the deposited lining tube is melted and contracted into the solid core rod, corrosion treatment is carried out to the solid core rod, and the diameter difference of the solid core rod before and after corrosion is between 0.5 and 4.5 mm.

3. The method of claim 2, wherein
   a ratio (b/a) between a diameter of an inner cladding layer of the core rod and a diameter (a) of a core layer of the core rod of the optical fiber preform is 1.8-2.8;
   a ratio ((c−b)/a) between the difference between a diameter (c) of a depressed cladding layer of the core rod and the diameter (b) of the inner cladding layer of the core rod and the diameter (a) of the core layer is 1.0-2.8;
   an effective diameter (d) of the optical fiber preform is 95-205 mm; and a ratio (d/c) between the effective diameter (d) of the optical fiber preform and the diameter (c) of the depressed cladding layer of the core rod is 3.5-5.

4. The method of claim 2, wherein for the pure quartz lining tube, before the deposition of the inner cladding layer, fluorine-doped depressed cladding layers are deposited by the PCVD process, so that the cross sectional area (CSA) of the fluorine-doped depressed cladding layer deposited by the PCVD process is equal to a designed circular ring area of the depressed cladding layer of the core rod, the relative refraction index difference of the fluorine-doped depressed cladding layer deposited by the PCVD process is expressed with $\Delta_{302}$, and $\Delta_{302}$ is between −0.2% and −0.6%.

5. The method of claim 2, wherein
   a process for directly depositing the pure SiO$_2$ glass outer cladding layer comprises an OVD (outside vapor deposition) method, a VAD (vapor axial deposition) method, or an APVD (advanced plasma vapor deposition) method;

in the VAD or OVD method, the ratio between the diameters of the core rod and the core layer is equal to or greater than 4.2; and in the APVD method, the ratio between the diameters of the core rod and the core layer is equal to or greater than 3.5.

6. The method of claim 2, wherein the relative refraction index difference ($\Delta_1$) of a core layer of the optical fiber preform is between 0.32% and 0.36%, and the relative refraction index difference ($\Delta_2$) of an inner cladding layer of the optical fiber preform is between −0.07% and −0.02%.

7. The method of claim 1, wherein
a ratio (b/a) between a diameter of an inner cladding layer of the core rod and a diameter (a) of a core layer of the core rod of the optical fiber preform is 1.8-2.8;

a ratio ((c−b)/a) between the difference between a diameter (c) of a depressed cladding layer of the core rod and the diameter (b) of the inner cladding layer of the core rod and the diameter (a) of the core layer is 1.0-2.8;

an effective diameter (d) of the optical fiber preform is 95-205 mm; and a ratio (d/c) between the effective diameter (d) of the optical fiber preform and the diameter (c) of the depressed cladding layer of the core rod is 3.5.

8. The method of claim 1, wherein for the pure quartz lining tube, before the deposition of the inner cladding layer, fluorine-doped depressed cladding layers are deposited by the PCVD process, so that the cross sectional area (CSA) of the fluorine-doped depressed cladding layer deposited by the PCVD process is equal to a designed circular ring area of the depressed cladding layer of the core rod, the relative refraction index difference of the fluorine-doped depressed cladding layer deposited by the PCVD process is expressed with $\Delta_{302}$, and $\Delta_{302}$ is between −0.2% and −0.6%.

9. The method of claim 1, wherein
a process for directly depositing the pure $SiO_2$ glass outer cladding layer comprises an OVD (outside vapor deposition) method, a VAD (vapor axial deposition) method, or an APVD (advanced plasma vapor deposition) method;

in the VAD or OVD method, the ratio between the diameters of the core rod and the core layer is equal to or greater than 4.2; and in the APVD method, the ratio between the diameters of the core rod and the core layer is equal to or greater than 3.5.

10. The method of claim 1, wherein the relative refraction index difference ($\Delta_1$) of a core layer of the optical fiber preform is between 0.32% and 0.36%, and the relative refraction index difference ($\Delta_2$) of an inner cladding layer of the optical fiber preform is between −0.07% and −0.02%.

11. The method of claim 1, wherein the hydroxyl content of the lining tube is equal to or smaller than 0.05 ppm.

12. The method of claim 11, wherein the hydroxyl content of the lining tube is equal to or smaller than 0.03 ppm.

13. A method for manufacturing an optical fiber preform, the method comprising:
a) providing a lining tube as a substrate tube, the lining tube being a pure quartz glass lining tube, the pure quartz glass lining tube having an outer diameter being 45-55 mm, a wall thickness being 2-4 mm, and a hydroxyl content being equal to or smaller than 0.10 ppm;

b) doping and depositing by a plasma chemical vapor deposition (PCVD) or modified chemical vapor deposition (MCVD) process, comprising transporting a reacting gas comprising silicon tetrachloride and oxygen into the lining tube of a); introducing a fluorine-containing gas into the reacting gas for fluorine doping; introducing germanium tetrachloride into the reacting gas for germanium doping; ionizing the reacting gas, the fluorine-containing gas, and the germanium tetrachloride in the lining tube through microwaves to form plasma, depositing on an inner wall of the lining tube a glass; and changing flow rates of the fluorine-containing gas and the germanium tetrachloride introduced into the reacting gas to deposit a depressed cladding layer, an inner cladding layer, and a core layer in sequence to obtain a deposited lining tube;

c) melting the deposited lining tube of b) into a solid core rod by an electric furnace;

d) sleeving the solid core rod of c) into a pure quartz glass jacketing tube to produce an optical fiber preform, a difference between a diameter of an inner hole of the pure quartz glass jacketing tube and a diameter of the solid core rod being between 1.5 and 4 mm, wherein an effective diameter of the optical fiber preform is between 95 and 205 mm.

e) directly drawing the optical fiber preform of d) into fibers through a fiber drawing furnace, and during the fiber drawing process, performing vacuumization between the core rod and the pure quartz glass jacketing tube, and maintaining the internal pressure between 1,000 and 10,000 Pa; and f) maintaining the fiber drawing speed of the fiber drawing furnace between 1,300 and 1,600 m/min, and during the fiber drawing process, coating a bare optical fiber with two layers of coatings, for a first coating, the modulus of the coating being between 0.8 and 1.5 MPa, and the glass transition temperature being between −55° C. and −35° C.; for a second coating, the modulus of the coating being between 900 and 1,100 MPa, and the glass transition temperature being between 60 and 80° C.

14. The method of claim 13, wherein a mode field diameter of the optical fiber at 1310 nm wavelength is 8.4-9.2 μm.

15. The method of claim 13, wherein
an attenuation coefficient of the optical fiber at 1,310 nm wavelength is equal to or smaller than 0.344 dB/km;

an attenuation coefficient of the optical fiber at 1,383 nm wavelength is equal to or smaller than 0.324 dB/km;

an attenuation coefficient of the optical fiber at 1,550 nm wavelength is equal to or smaller than 0.204 dB/km; and an attenuation coefficient of the optical fiber at 1,625 nm wavelength is equal to or smaller than 0.214 dB/km.

16. The method of claim 13, wherein
for the optical fiber at 1,625 nm wavelength, an additional bending loss is equal to or lower than 0.2 dB under the condition of 7.5 mm bending radius per turn;

for the optical fiber at 1,625 nm wavelength, an additional bending loss is equal to or lower than 0.4 dB under the condition of 5.0 mm bending radius per turn;

a dynamic stress corrosion susceptibility parameter ($n_d$) value of the optical fiber is equal to or greater than 27;

a optic cable cutoff wavelength of the optical fiber is equal to or smaller than 1,260 nm;

a zero-dispersion wavelength of the optical fiber is between 1,300 and 1,324 nm;

a slope of the zero-dispersion wavelength of the optical fiber is equal to or lower than 0.092 ps/nm²*km.

* * * * *